United States Patent
Barton et al.

(10) Patent No.: US 11,134,059 B2
(45) Date of Patent: Sep. 28, 2021

(54) MICRO-FIREWALLS IN A MICROSERVICE MESH ENVIRONMENT

(71) Applicant: Cisco Technology, Inc., San Jose, CA (US)

(72) Inventors: Robert Edgar Barton, Richmond (CA); Jerome Henry, Pittsboro, NC (US); Matthias Falkner, Ottawa (CA); Maik Guenter Seewald, Nuremberg (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 311 days.

(21) Appl. No.: 16/209,291

(22) Filed: Dec. 4, 2018

(65) Prior Publication Data
US 2020/0177549 A1 Jun. 4, 2020

(51) Int. Cl.
*H04L 29/06* (2006.01)
*H04L 12/24* (2006.01)

(52) U.S. Cl.
CPC ...... *H04L 63/0263* (2013.01); *H04L 41/0816* (2013.01); *H04L 41/14* (2013.01); *H04L 41/5041* (2013.01); *H04L 63/0254* (2013.01); *H04L 63/1425* (2013.01); *H04L 63/1441* (2013.01); *H04L 63/20* (2013.01)

(58) Field of Classification Search
CPC ............. H04L 63/0263; H04L 63/1425; H04L 63/1441; H04L 41/5041; H04L 63/20; H04L 41/0816; H04L 41/14; H04L 63/0254; H04L 41/5054; H04L 41/5051; H04L 63/0218
See application file for complete search history.

(56) References Cited

U.S. PATENT DOCUMENTS

| | | | |
|---|---|---|---|
| 9,521,115 B1 * | 12/2016 | Woolward | .......... H04L 63/1416 |
| 9,716,617 B1 | 7/2017 | Ahuja et al. | |
| 2016/0269425 A1 * | 9/2016 | Shieh | .................. H04L 63/0254 |
| 2016/0294858 A1 * | 10/2016 | Woolward | .............. H04L 63/20 |
| 2017/0093921 A1 | 3/2017 | Duan | |
| 2017/0093922 A1 | 3/2017 | Duan | |

(Continued)

OTHER PUBLICATIONS

Sai Chaitanya, "One Stop Container Networking", CNA1091BU, vmworld2017, Aug. 28, 2017, 42 pages.

(Continued)

*Primary Examiner* — Christopher C Harris
(74) *Attorney, Agent, or Firm* — Edell, Shapiro & Finnan, LLC (57) ABSTRACT

A server, in communication with a plurality of microservices in a microservices mesh environment, obtains data about inbound communications to a first microservice and outbound communications from the first microservice of the plurality of microservices. The server analyzes the data to learn an operational behavior of the first microservice and determine a firewall rule set to be applied associated with the first microservice based on the operational behavior learned for the first microservice. The server causes a micro-firewall to be instantiated for the first microservice. The micro-firewall is configured to apply the firewall rule set to inbound communications to the first microservice and outbound communications from the first microservice.

20 Claims, 6 Drawing Sheets

(56) References Cited

U.S. PATENT DOCUMENTS

| | | | |
|---|---|---|---|
| 2017/0093923 A1 | 3/2017 | Duan | |
| 2017/0353498 A1 | 12/2017 | Huang et al. | |
| 2017/0353499 A1 | 12/2017 | Huang et al. | |
| 2017/0374032 A1 | 12/2017 | Woolward et al. | |
| 2018/0255100 A1* | 9/2018 | Degioanni | H04L 63/1425 |
| 2018/0278639 A1* | 9/2018 | Bernstein | G06F 21/577 |
| 2019/0020665 A1* | 1/2019 | Surcouf | H04L 9/3236 |
| 2019/0213326 A1* | 7/2019 | Dykes | G06F 21/552 |
| 2019/0273746 A1* | 9/2019 | Coffing | H04L 63/105 |
| 2019/0394219 A1* | 12/2019 | Huang | H04L 41/22 |
| 2020/0133789 A1* | 4/2020 | Natanzon | G06F 16/2365 |

OTHER PUBLICATIONS

Murugiah Souppaya et al., "Application Container Security Guide", NIST Special Publication 800-190, https://doi.org/10.6028/NIST.SP.800-190, Sep. 2017, 63 pages.

Alfredo Hickman, "Container Intrusions: Assessing the Efficacy of Intrusion Detection and Analysis Methods for Linux Container Environments", SANS Institute InfoSec Reading Room, Jan. 13, 2018, 32 pages.

Tigera, "Project Calico v3.2", Aug. 15, 2018, 6 pages.

Joab Jackson, "CoreOS Introduces Container Scanning for Vulnerabilities", https://thenewstack.io/coreos-introduces-container-scanning-for-vulnerabilities, Nov. 13, 2015, 7 pages.

Gary Duan, "Next Generation Firewall vs. Container Firewall-NeuVector", https://neuvector.com/network-security/next-generation-firewall-vs-container-firewall/, downloaded Sep. 26, 2018, 9 pages.

Gary Duan, "Using Web App Firewalls and Container Firewalls to Secure App Containers", Dec. 13, 2017, 4 pages.

Yuqiong Sun et al., "Security-as-a-Service for Microservices-Based Cloud Applications", Nov. 30-Dec. 3, 2015, 8 pages.

Aqua Security Software Ltd., "Aqua Container Security Platform", https://www.aquasec.com/products/aqua-container-security-platform/, downloaded Sep. 26, 2018, 13 pages.

\* cited by examiner

MICRO-FIREWALLS IN A MICROSERVICE MESH ENVIRONMENT

TECHNICAL FIELD

The present disclosure relates to microservices.

BACKGROUND

As microservices begin to proliferate and replace monolithic applications, security within the containerized model is becoming important. However, once a microservice-based application is consumed, additional security threats can be introduced. Traffic destined to the microservice-based application may contain malware or other attacks targeting vulnerabilities of one of more of constituent microservices.

DESCRIPTION OF EXAMPLE EMBODIMENTS

Overview

Briefly, in one embodiment a server, in communication with a plurality of microservices in a microservices mesh environment, obtains data about inbound communications to a first microservice and outbound communications from the first microservice of the plurality of microservices. The server analyzes the data to learn an operational behavior of the first microservice and determines a firewall rule set to be applied and associated with the first microservice based on the operational behavior learned for the first microservice. The server causes a micro-firewall to be instantiated for the first microservice. The micro-firewall is configured to apply the firewall rule set to inbound communications to the first microservice and outbound communications from the first microservice.

Example Embodiments trend in application computing has developed to break a large monolith application into multiple smaller applications. These smaller applications are called microservices. A microservice is a piece of software that can be executed on its own and has a generic interface for being accessed. Hypertext Transfer Protocol (HTTP) is a common interface for accessing a microservice. The concept behind microservices is that they should focus on one component of an application. Microservices run independently and they can be dynamically spun up and taken down, as needed. A service mesh may be used to enable connectivity between microservices. The ability to secure inter-microservices communications has become more important as microservices are becoming more widely used.

Containers are tools used to organize and develop microservices. A container is used to package software, including everything needed to run: code, runtime, system tools, system libraries, and settings. A container completely isolates the software from any other software in the same environment.

While microservice security is an emerging field, most of the attention is placed on basic Layer 3/Layer 4 (L3/L4) stateless firewalls attached to the container itself. Little attention is given to application-layer vulnerabilities and malware prevention, such as those protected by a next-generation (next-gen) firewall.

Embodiments are presented herein that involve applying application-layer stateful firewall policy to a distributed containerized/microservices environment. Application-layer inspection and security policy capabilities are applied as traffic is passed to, or between, microservices in a service mesh namespace. A learning mechanism is employed to generate intent-based micro-firewalls at the microservice level.

Figure 1:
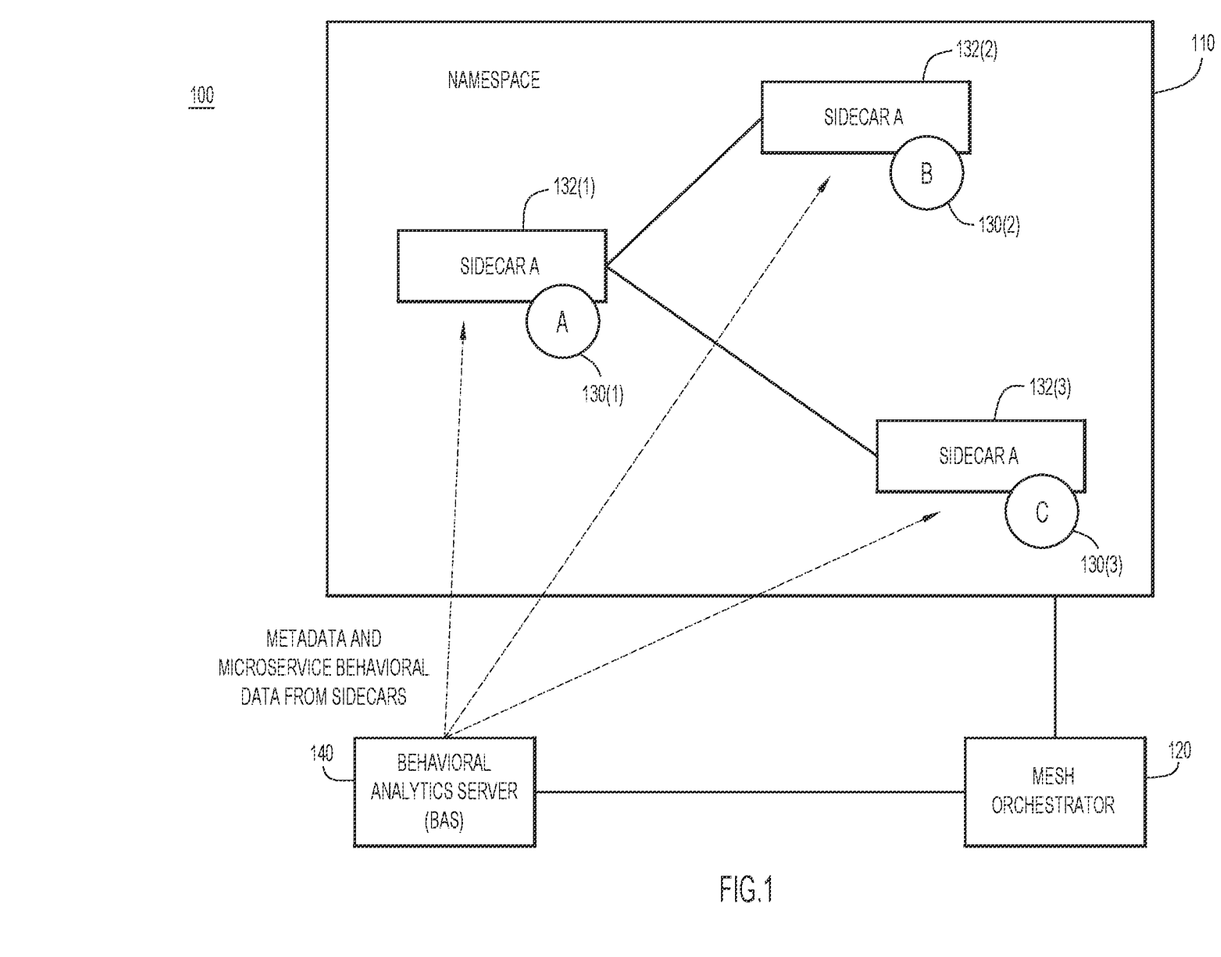
FIG. 1 is block diagram of a system configured to learn about characteristics of microservices in order to deploy appropriate micro-firewalls in a microservices mesh environment, according to an example embodiment.

Reference is first made to FIG. 1. FIG. 1 shows a system 100 that includes a namespace 110, a mesh orchestrator 120 for the namespace 110 and a behavioral analytics server (BAS) 140 connected to the namespace 110 and to the container orchestrator 120. Namespaces are a way to divide compute cluster resources between multiple users. Namespaces are intended for use in environments with many users spread across multiple teams, or projects. Namespaces provide a scope for names. Names of resources need to be unique within a namespace, but not across namespaces.

The mesh orchestrator 120 may employ, for example, Kubernetes™ orchestration techniques. The mesh orchestrator 120 deploys microservices in the namespace 110. For example, FIG. 1 shows microservices 130(1), 130(2) and 130(3), denoted microservice A, microservice B and microservice C, respectively.

A sidecar may be attached to each microservice in the environment. More precisely, the sidecar is attached to the container and is used to form the service mesh. The microservice runs within the container. For example, sidecar A at 132(1) is attached to microservice A, sidecar B at 132(2) is attached to microservice B and sidecar C at 132(3) is attached to microservice C. A sidecar (or sidecar pattern) may include components of an application that are deployed into a separate process or container to provide isolation and encapsulation. This enables applications to be composed of heterogeneous components and technologies. In one example, the sidecars 132(1), 132(2) and 132(3) perform network interface functions to enable communications between microservices.

In the context of the embodiments presented herein, the sidecars 132(1), 132(2) and 132(3) are further programmed to analyze the application behavior and capture metadata about the respective microservice 130(1), 130(2) and 130(3), including inbound communications to that microservice and outbound communications from that microservice. Thus, the sidecars 132(1), 132(2) and 132(3) supply metadata and application behavioral data to the BAS 140. Examples of metadata and application behavior data that the sidecars capture include protocol type(s), Quality of Service (QoS) markings, port numbers, and data rate samplings (i.e., Netflow® data). The metadata and application behavioral data may also include raw application information (such as Hypertext Transfer Protocol (HTTP) headers) that identifies the type of application making the Application Programming Interface (API) call and how it is communicating.

Figure 2:
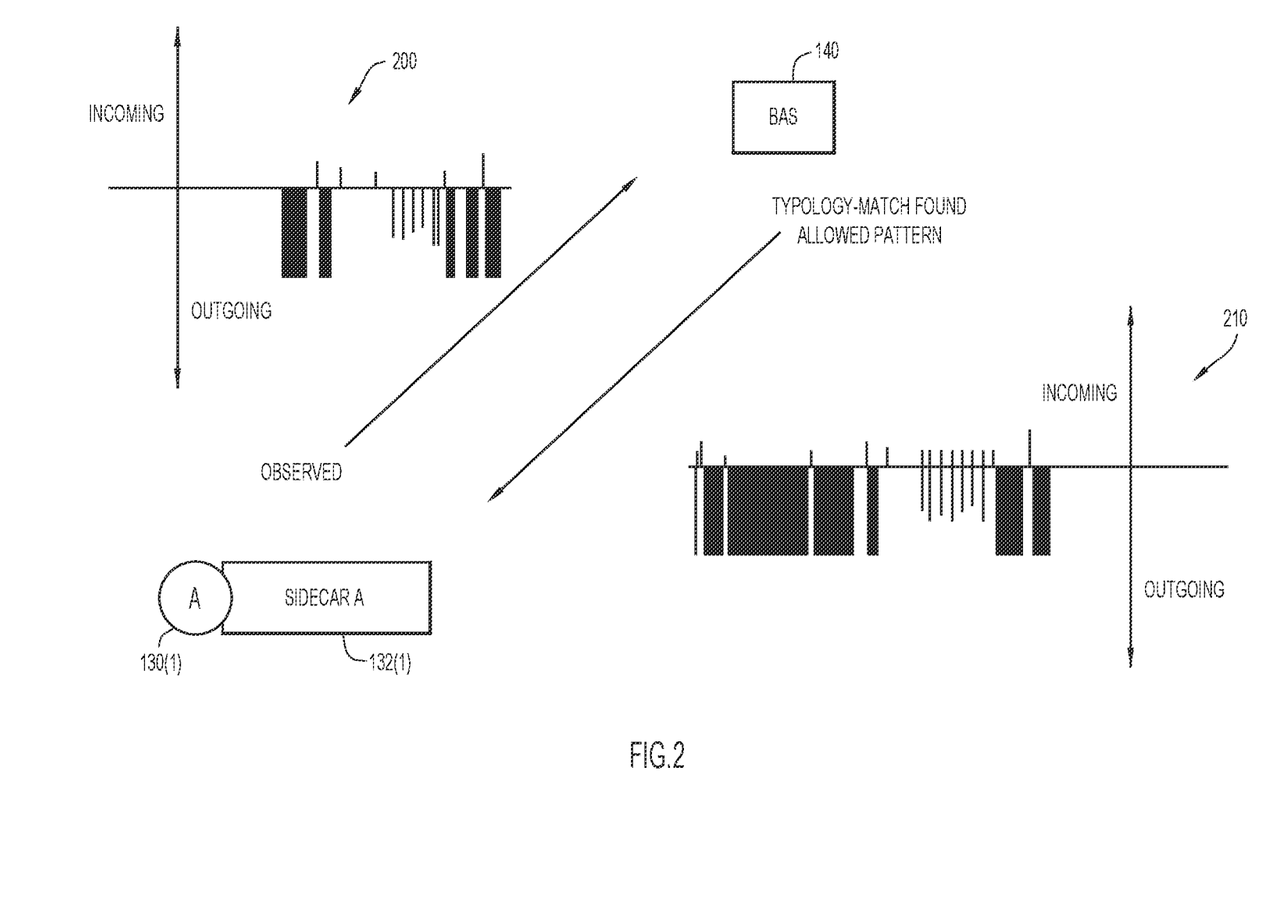
FIG. 2 is a diagram graphically depicting operations of a behavior analytics server forming a part of the system shown in FIG. 1, according to an example embodiment.

The BAS 140 communicates with the sidecars 132(1), 132(2) and 132(3) and extracts the observed (metadata and application behavioral) information about each associated microservice, e.g., microservices 130(1), 130(2) and 130(3). As shown in FIG. 2, the BAS 140 makes an assessment about what kind of an application is running in this microservice and matches it to a set of (next-gen) firewall rules that are specific to this application type (such as rules defining normal behavior of a particular type of microservice). For example, sidecar A 132(1) supplies to the BAS 140 information, graphically depicted at 200, about incoming communications to the microservice and outgoing communications from the microservice. The BAS 140 compares the information 200 with stored information about microservices to determine a microservice with similar behavior to the information 200, as depicted at 210 in FIG. 2, and thereby find a typology-match of an allowed pattern.

Based on the learned information from the sidecar, the BAS 140 builds a security policy for the associated microservice. For example, if the microservice is running some type of web application, the BAS 140 enlists only the firewall rules with relevance to this type of microservice with the expected behavior (whitelist model). The rules can apply to exchange patterns, ports, calls or other identified traffic structure. This results in creation of an "intent-based" microservice firewall. Intent can also be defined by a service operator, but in the context of the techniques presented herein, it is "learned intent".

Figure 3:
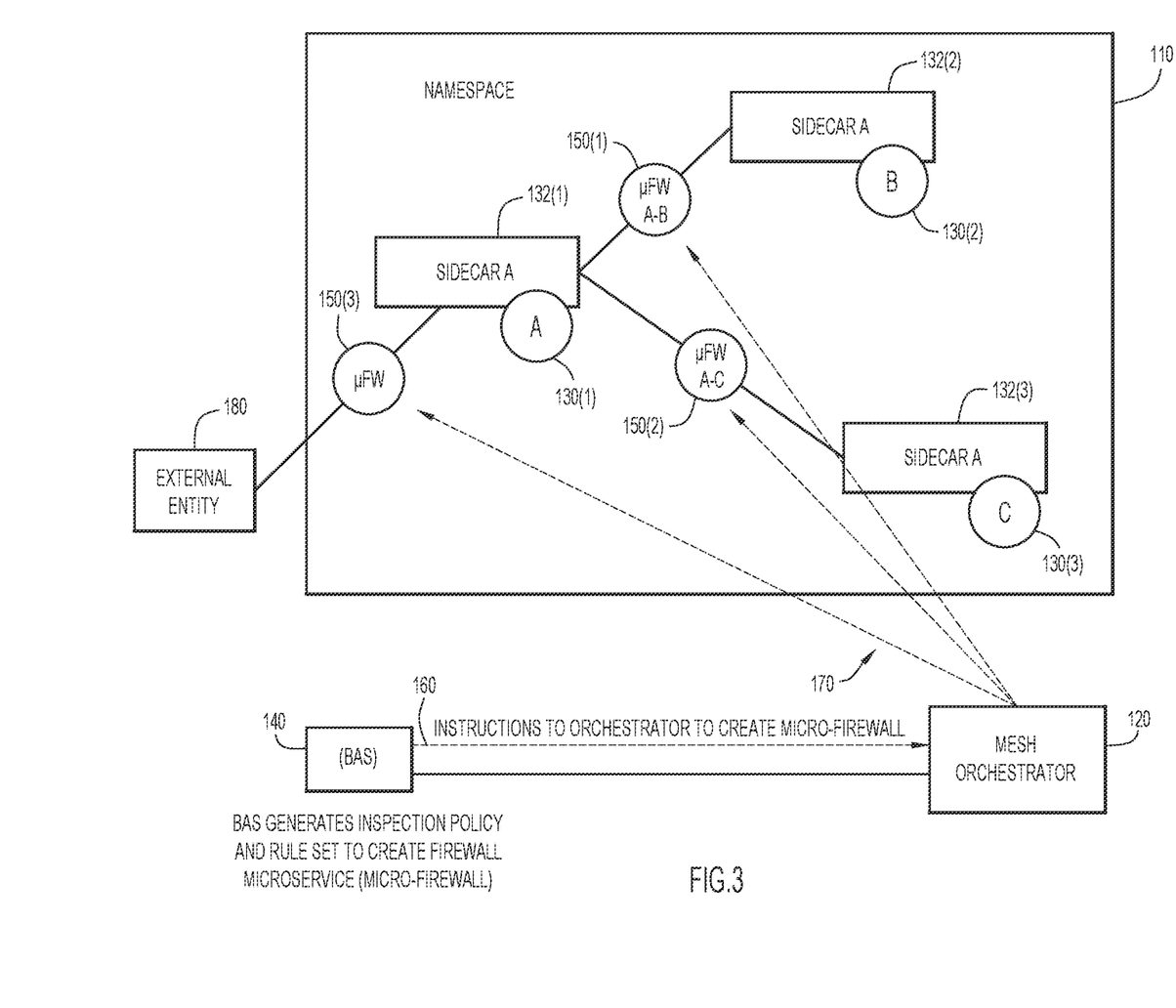
FIG. 3 is a diagram similar to FIG. 1, and showing instantiation of micro-firewalls in the microservices mesh environment based on learned behavior of the microservices, according to an example embodiment.

Reference is now made to FIG. 3. With a set of rules defining the desired firewall inspection and policy, the BAS 140 generates a new firewall microservice and deploys it to the namespace 110. This is the "micro-firewall". More specifically, at 160, the BAS 140 communicates instructions to the mesh orchestrator 120 to instantiate the micro-firewall in the namespace 110. As shown at 170, the mesh orchestrator 120 instantiate the micro-firewall 150(1) between microservices A and B, and micro-firewall 150(2) between microservices A and C. The mesh orchestrator 120 also programs the sidecars 132(1) and 132(2) of the two associated microservices, e.g., microservice A and microservice B, to redirect all traffic between them through the new micro-firewall, µFW A-B shown at 150(1), in FIG. 3. The micro-firewall 150(1) thus applies inspection rules and policies to the traffic between microservices A and B. The mesh orchestrator 120 performs similar operations for the micro-firewall (µFW A-C) 150(2) instantiated between microservices A and C, created based on knowledge the BAS 140 obtains from sidecars A and C for traffic between microservices A and C.

Once instantiated, the micro-firewall applies the limited firewall rule set to communications between microservices. The micro-firewall will permit traffic that complies with the firewall rule set and drop any traffic that does not comply with the rule set.

FIG. 3 further shows that a micro-firewall can be instantiated for communications between a microservice, e.g., microservice 130(1), and an entity (physical or virtual) outside of the namespace/mesh environment. An external entity is shown at 180, and a micro-firewall 150(3) may be instantiated for communications between microservice 130 (1) and the external entity 180. In this sense, the microservice 130(1) can be said to be an edge microservice at least with respect to the external entity 180.

Figure 4A:
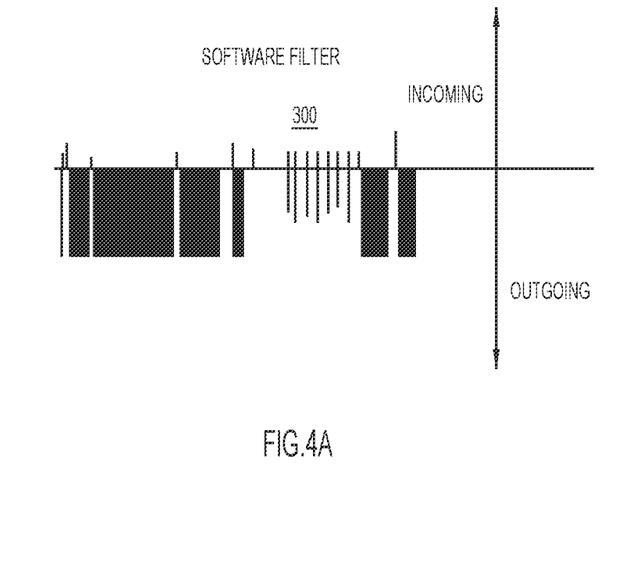
FIG. 4A is a diagram graphically depicting a software filter function that may be performed by a micro-firewall, according to an example embodiment.
Figure 4B:
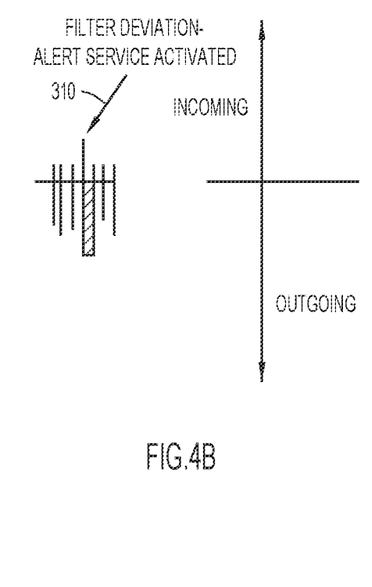
FIG. 4B is a diagram graphically depicting an alert activated by the software filter shown in FIG. 4A, upon occurrence of a filter deviation, according to an example embodiment.

Reference is now made to FIGS. 4A and 4B. The ruleset used by a micro-firewall may be implemented within a software filtering structure. Such a software filter is shown at 300 in FIG. 4A. Use of a software filter may ensure that directing traffic through the micro-firewall will not slow down transactions between microservices, or negatively impact the performance of the overall system. In such a software filtering structure, the filter acts as a semi-passive system. As shown at 310 in FIG. 4B, the software filter activates an alarm only when traffic deviates from the semi-passive filter structure.

The knowledge the BAS 140 obtains from sidecars allows for the BAS 140 to analyze inbound information such as context, location, and other information to enhance the rules used by an instantiated micro-firewall.

The focused/limited firewall rule set of the micro-firewall is based on the behavioral patterns of the microservice. Since microservices are fluid (created, destroyed, etc.), the creation of the micro-firewalls are just as fluid. Thus, as microservices are dynamically spun up and down, their behavior is monitored, and a particular rule set is selected and instantiated on a micro-firewall on-the-fly. The micro-firewall is instantiated between microservices, not inside the microservice or container itself.

A microservice does a very specific function and performs a small number of well-defined tasks. Using the metadata provided by the sidecars, the BAS 140 learns about the functions the microservice is performing. Based on that, the BAS determines the few/limited number of matching rules that are relevant to that microservice-microservice or microservice-other entity communication. The mesh orchestrator 120 instantiates the micro-firewall that applies those rules to communications between microservices, and denies all other communications that fall outside of the scope of the few matching rules.

As an example, consider a microservice that runs in an Internet of Things (IoT) fog platform and performs a message broker function to pass messages between an endpoint and a broker, or between brokers. This is a very specific task. The microservice may use the Message Queuing Telemetry Transport (MQTT) protocol. The MQTT protocol is a publish/subscribe lightweight messaging protocol, designed for constrained devices and low-bandwidth, high-latency or unreliable networks. The BAS 140 would learn that the microservice is operating in order to communicate with a message broker. Thus, the BAS 140 would configure the micro-firewall to use MQTT policy rules, and nothing more. Those policy rules would prescribe what is normal for MQTT communications, such as source/destination addresses, package size, package burst parameters, etc. Any communications that a micro-firewall observes which are outside that limited set of policy rules would be dropped by the micro-firewall.

Another example is a microservice that communicates SQL database commands. In such a situation, the BAS 140 would generate a set of policy rules for the micro-firewall that is limited to expected SQL commands for database types of communications by a microservice.

While it is expected that traffic between microservices may be encrypted, the introduction of a micro-firewall does not change this approach. Instead of encryption between the microservices themselves, the encryption of traffic will lie between the microservice and its adjacent micro-firewall.

Figure 5:
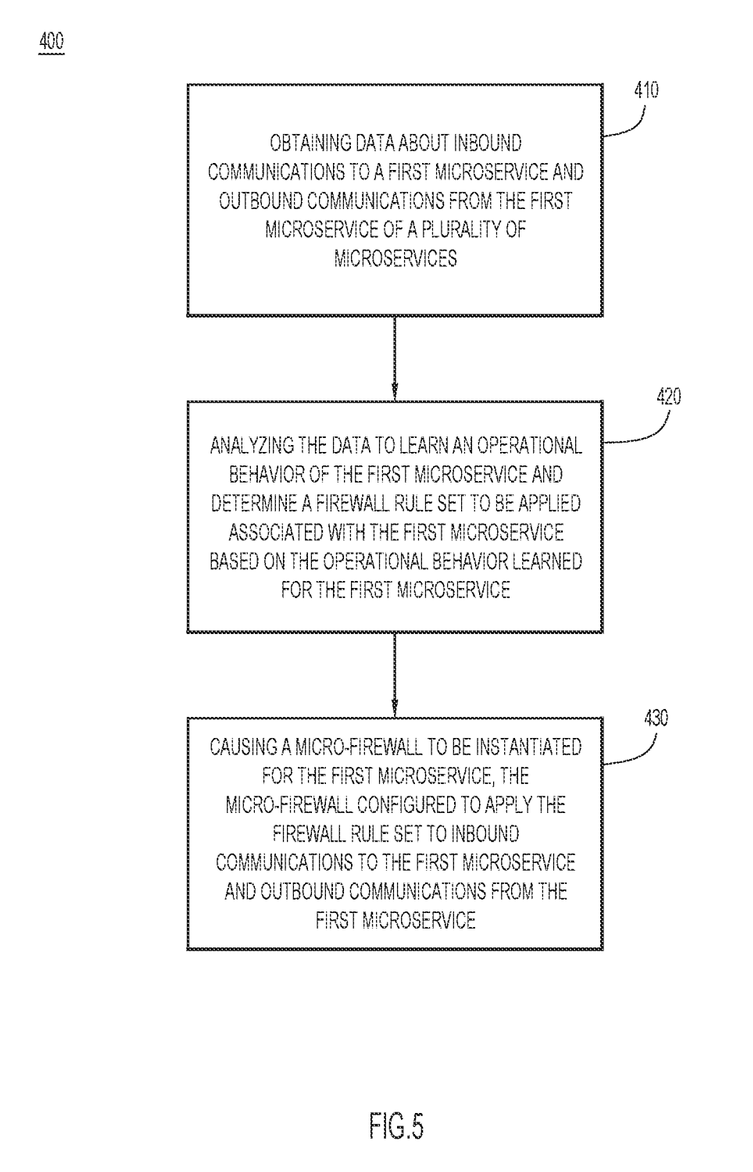
FIG. 5 is a flow chart depicting operations performed by the behavior analytics server to dynamically instantiate micro-firewalls in a microservices mesh environment, according to an example embodiment.

Reference is now made to FIG. 5. FIG. 5 illustrates a flow chart of a method 400 performed by the BAS 140 shown in preceding figures. At 410, the BAS, which is in communication with a plurality of microservices in a microservice mesh environment, obtains data about inbound communications to a first microservice and outbound communications from the first microservice of a plurality of microservices in a microservices mesh environment.

At 420, the BAS analyzes the data to the data to learn an operational behavior of the first microservice and determine a firewall rule set to be applied associated with the first microservice based on the operational behavior learned for the first microservice.

At 430, the BAS causes a micro-firewall to be instantiated for the first microservice, the micro-firewall configured to apply the firewall rule set to inbound communications to the first microservice and outbound communications from the first microservice.

In one embodiment, the inbound communications may be from a second microservice to the first microservice, and the outbound communications from the first microservice to the second microservice. In another embodiment, the inbound communications are from an entity outside the microservices mesh to the first microservice, and the outbound communications are from the first microservice to the entity outside the microservices mesh. In this case, the first microservice can be said to be at the edge of the microservices mesh.

In one form, the analyzing operation 420 may include determining a type of application running in the first microservice. Furthermore, the analyzing may include determining the firewall rule set according to rules associated with normal behavior of a microservice that performs the type of application running in the first microservice.

In one form, the obtaining operation 410 may include obtaining application behavior data and metadata captured by a first sidecar function attached to a container for the first microservice. Moreover, the analyzing operation may include comparing the application behavioral data and the metadata obtained for the first microservice with stored information about microservices in order to find a match to a microservice with similar behavior.

The causing operation 430 may involve the BAS instructing a mesh orchestrator or other similar entity/function that manages the plurality of microservices to instantiate the micro-firewall for the first microservice and a second microservice in communication with the first microservice. Moreover, operation 430 may further include the mesh orchestrator programming the first sidecar function and a second sidecar function associated with the second microservice to redirect all traffic between them, on behalf of the first microservice and second microservice, respectively, to the micro-firewall.

As explained above, the firewall rule set is a limited set of rules determined based on communications expected for the first microservice. In one form, the micro-firewall executes the firewall rule set using a software filtering structure.

Although the foregoing describes that a micro-firewall is instantiated on demand as applications are discovered, the micro-firewalls also become part of the cloud orchestration policy. For example, if a new micro-firewall is created for a certain microservice, when the mesh orchestrator 120 creates/spins up a new and similar microservice container, the mesh orchestrator 120 can automatically create/add the same micro-firewall to that container communication, bypassing the learning operation (since it has already been learned for a similar microservice). In addition, as containers are removed, mesh orchestrator can remote the micro-firewall associated with that container.

Thus, operation 430 shown in FIG. 5 may be performed such that micro-firewalls are created and removed as microservice containers are dynamically created and removed. Moreover, operation 420 may be performed such that when a new microservice container is created that includes a microservice that is similar to the first microservice, the causing operation comprises causing the micro-firewall to be instantiated for the new microservice container without performing the analyzing operation 420 for the new microservice container.

Figure 6:
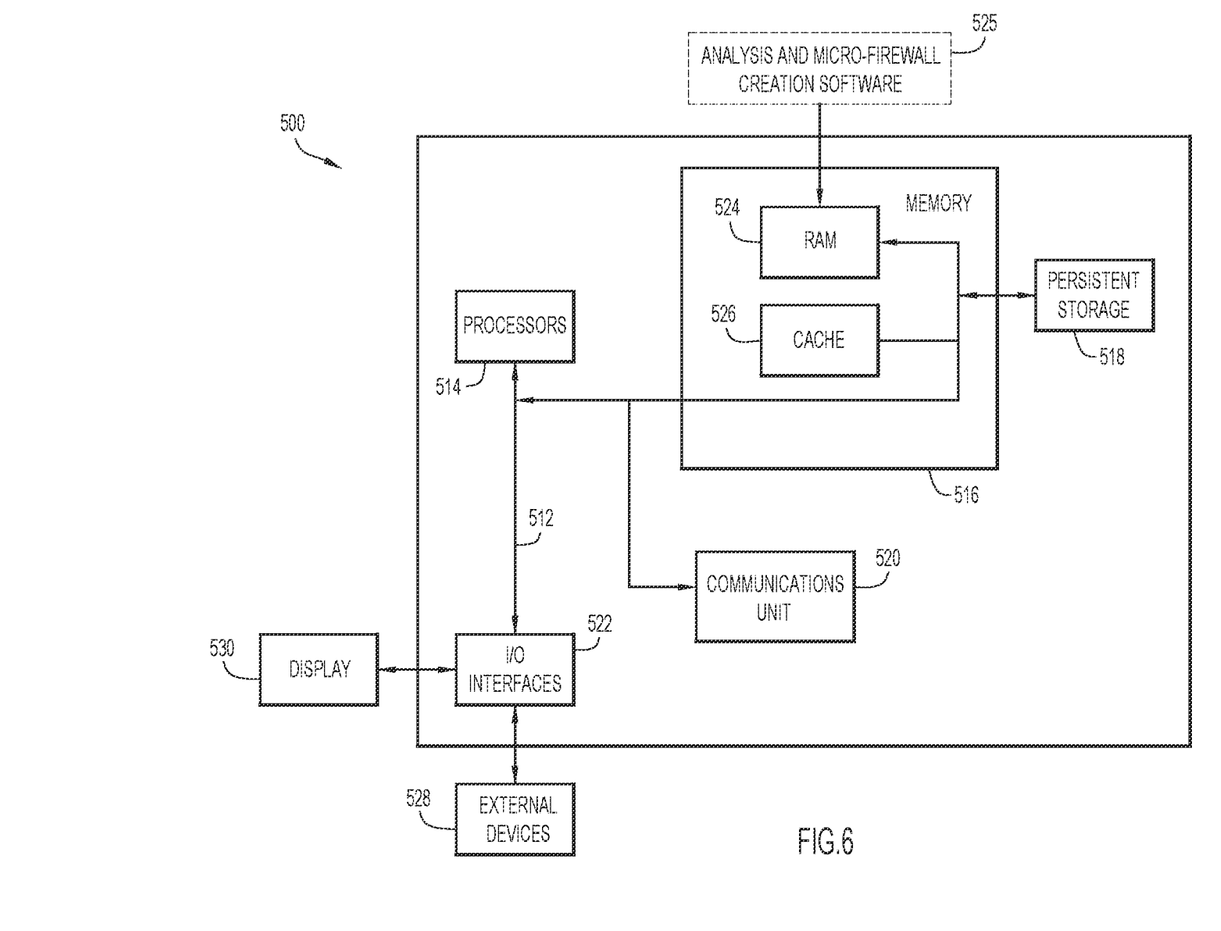
FIG. 6 is a block diagram of the behavior analytics server, according to an example embodiment.

FIG. 6 illustrates a hardware block diagram of a server device 500 configured to perform the operations of the BAS 140 described herein. It should be appreciated that FIG. 6 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. The RAM 524 stores or is encoded with, for example, instructions for analysis and micro-firewall creation software shown at 525 in FIG. 6. When the processors 514 execute the analysis and micro-firewall creation software 525, the server device 500 performs the operations of the BAS 140 described herein in connection with FIGS. 1-5.

One or more programs (e.g., the analysis and micro-firewall creation software 525) may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer 500.

For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any type of communications network (e.g., local area network (LAN), wide area network (WAN), Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, EPROM or Flash memory, a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, a security policy between two communicating microservices (or an edge microservice) is learned. A new micro-firewall container is generated and is deployed to the namespace (microservices mesh environment). The network connection (handled by sidecars, for example) between the two microservices is modified to pass all traffic through the new micro-firewall.

These embodiments have an advantage over existing security deployments and, in its simpler form, can simply rely on L3/L4 policy on the sidecar or container itself. A more complex form of applying traffic patterning is also possible. By implementing a micro-firewall between the microservices (or between a microservice and an entity outside the microservices mesh environment), it is possible to enforce a much richer security policy in order to protect against only the relevant types of malware.

By monitoring communications associated with a microservice/container, and extracting metadata from such communications, it can be determined what type of data should be passed from one container to another. By performing behavior analysis on that data, the behavioral analytics server can determine what is acceptable behavior, and ultimately can determine the microservice type. This knowledge may be shared with a cloud orchestration server to create a new microservice (micro-firewall that instantiates the security policy) that operates between the functional microservices (or between an edge microservice and an entity outside the microservices mesh environment).

Again, presented herein are application-layer inspection and security policy capabilities between containers and microservices as traffic is passed to or between microservices in a service mesh. The method employs a learning mechanism to generate intent-based micro-firewalls at the microservice level with auto-deployment of the micro-firewall based on the learned behavior and dynamically generated policy.

In one example, the micro-firewall may need a route change. Route changes can be added as part of the automated micro-firewall deployment. For example, when the micro-firewall is deployed, the control plane (mesh orchestrator) also updates the route changes so traffic will pass through the firewall between adjacent containers. In another case, the micro-firewall can be deployed transparently as an overlay.

The embodiments presented herein involve profiling the overall behavior of the microservice in order to dynamically generate a policy that will protect it. The sidecar functions referred to above can analyze traffic before encryption, learning details about the behavior of the microservice, such as who it is communicating with, who it should be communicating with, context, as well as the application typology. The metadata may include traffic flow information (such as Netflow™ data), but is not limited to it. The data may include, for example, HTTP headers and other application metadata, etc. Importantly, this is done on a microservice-to-microservice communication (or microservice-to-external entity communication) basis such that micro-firewalls with unique policies can be deployed in the namespace. Based on this information, a unique ruleset is generated for each microservice-to-microservice/external entity interaction using a variety of variables that includes global security policy, context, and results of the metadata analysis.

As a result, it is not necessary to deploy a bloated firewall with thousands of rules. Rather, a "skinny" deep packet inspection (DPI) firewall is deployed based on only what the microservice interaction should be. This improves overall performance, while delivering next generation firewall capabilities in the microservice namespace.

Thus, in one form, a method is provided including: at a server in communication with a plurality of microservices in a microservices mesh environment, obtaining data about inbound communications to a first microservice and outbound communications from the first microservice of the plurality of microservices; analyzing, by the server, the data to learn an operational behavior of the first microservice and determine a firewall rule set to be applied associated with the first microservice based on the operational behavior learned for the first microservice; and causing, by the server, a micro-firewall to be instantiated for the first microservice, the micro-firewall configured to apply the firewall rule set to inbound communications to the first microservice and outbound communications from the first microservice.

In another form, an apparatus is provided that comprises apparatus comprising: a communication interface configured to enable network communications including communications with a plurality of microservices in a microservices mesh environment; and a processor coupled to the communication interface, wherein the processor is configured to perform operations including: obtaining data about inbound communications to a first microservice and outbound communications from the first microservice of the plurality of microservices; analyzing the data to learn an operational behavior of the first microservice and determine a firewall rule set to be applied associated with the first microservice based on the operational behavior learned for the first microservice; and causing a micro-firewall to be instantiated for the first microservice, the micro-firewall configured to apply the firewall rule set to inbound communications to the first microservice and outbound communications from the first microservice.

In still another form, one or more non-transitory computer readable storage media are provided, encoded with instructions that, when executed by a processor of a server in communication with a plurality of microservices in a microservices mesh environment, cause the server to perform operations including: obtaining data about inbound communications to a first microservice and outbound communications from the first microservice of the plurality of microservices; analyzing the data to learn an operational behavior of the first microservice and determine a firewall rule set to be applied associated with the first microservice based on the operational behavior learned for the first microservice; and causing a micro-firewall to be instantiated for the first microservice, the micro-firewall configured to apply the firewall rule set to inbound communications to the first microservice and outbound communications from the first microservice.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server in communication with a plurality of microservices in a microservices mesh which is managed by a mesh orchestrator, obtaining data about inbound communications to a first microservice and outbound communications from the first microservice of the plurality of microservices, the data being obtained from and captured by a first sidecar function attached to a container for the first microservice and including application behavioral data and metadata of the first microservice;
   analyzing, by the server, the data to learn an operational behavior of the first microservice, based on comparing the application behavioral data and the metadata of the first microservice with stored information about microservices in order to find a match associated with the operational behavior, and to determine a firewall rule set associated with the first microservice based on the operational behavior learned for the first microservice; and instructing, by the server, the mesh orchestrator to instantiate a micro-firewall for the first microservice, the micro-firewall configured to apply the firewall rule set to inbound communications to the first microservice and outbound communications from the first microservice.

2. The method of claim 1, wherein the inbound communications are from a second microservice to the first microservice, and the outbound communications are from the first microservice to the second microservice.

3. The method of claim 1, wherein the inbound communications are from an entity outside the microservices mesh to the first microservice, and the outbound communications are from the first microservice to the entity outside the microservices mesh.

4. The method of claim 1, wherein analyzing to learn the operational behavior of the first microservice comprises determining a type of application running in the first microservice.

5. The method of claim 4, wherein analyzing includes determining the firewall rule set according to rules associated with normal behavior of a microservice that performs the type of application running in the first microservice.

6. The method of claim 1, wherein the server is in communication with the mesh orchestrator for a namespace in which the plurality of microservices are deployed.

7. The method of claim 1, wherein each one of the plurality of microservices has a respective container to which a respective sidecar function is attached for capturing respective application behavior data and metadata of a respective microservice, the method further comprising:
obtaining, from the respective sidecar function, the respective application and behavior data and metadata of the respective microservice to enhance a respective firewall rule set of a respective micro-firewall for the respective microservice.

8. The method of claim 1, wherein instructing the mesh orchestrator to instantiate the micro-firewall comprises instructing the mesh orchestrator to instantiate the micro-firewall between the first microservice and a second microservice in communication with the first microservice.

9. The method of claim 8, wherein instructing the mesh orchestrator to instantiate the micro-firewall causes the mesh orchestrator to program the first sidecar function and a second sidecar function associated with the second microservice to redirect all traffic between them, on behalf of the first microservice and second microservice, respectively, to the micro-firewall.

10. The method of claim 1, wherein the firewall rule set is a limited set of rules based on communications expected for the first microservice.

11. The method of claim 1, further comprising repeating the obtaining, the analyzing, the determining, and the instructing, for causing micro-firewalls to be created and removed as microservice containers are dynamically created and removed.

12. The method of claim 11, further comprising:
when a new microservice container is created that includes a microservice that is similar to the first microservice, instructing the mesh orchestrator to instantiate a new micro-firewall for the new microservice container according to the micro-firewall for the first microservice without performing the analyzing for the new microservice container.

13. An apparatus comprising:
a communication interface configured to enable network communications including communications with a plurality of microservices in a microservices mesh which is managed by a mesh orchestrator;
a memory for storing program instructions; and
a processor coupled to the communication interface, wherein the processor is configured to execute the program instructions to perform operations including:
obtaining data about inbound communications to a first microservice and outbound communications from the first microservice of the plurality of microservices, the data being obtained from and captured by a first sidecar function attached to a container for the first microservice and including application behavioral data and metadata of the first microservice;
analyzing the data to learn an operational behavior of the first microservice, based on comparing the application behavioral data and the metadata of the first microservice with stored information about microservices in order to find a match associated with the operational behavior, and to determine a firewall rule set associated with the first microservice based on the operational behavior learned for the first microservice; and
instructing the mesh orchestrator to instantiate a micro-firewall for the first microservice, the micro-firewall configured to apply the firewall rule set to inbound communications to the first microservice and outbound communications from the first microservice.

14. The apparatus of claim 13, wherein the inbound communications are from a second microservice to the first microservice, and the outbound communications are from the first microservice to the second microservice; or the inbound communications are from an entity outside the microservices mesh to the first microservice, and the outbound communications are from the first microservice to the entity outside the microservices mesh.

15. The apparatus of claim 13, wherein the processor is configured to execute the program instructions to perform the analyzing to learn the operational behavior of the first microservice by determining a type of application running in the first microservice and determining the firewall rule set according to rules associated with normal behavior of a microservice that performs the type of application running in the first microservice.

16. The apparatus of claim 15, wherein each one of the plurality of microservices has a respective container to which a respective sidecar function is attached for capturing respective application behavior data and metadata of a respective microservice, and the processor is further configured to obtain, from the respective sidecar function, the respective application and behavior data and metadata of the respective microservice to enhance a respective firewall rule set of a respective micro-firewall for the respective microservice.

17. The apparatus of claim 13, wherein the processor is configured to execute the program instructions to repeat the obtaining, the analyzing, the determining, and the instructing, for causing micro-firewalls to be created and removed as microservice containers are dynamically created and removed.

18. One or more non-transitory computer readable storage media encoded with instructions that, when executed by a processor of a server in communication with a plurality of microservices in a microservices mesh which is managed by a mesh orchestrator, cause the server to perform operations including:

obtaining data about inbound communications to a first microservice and outbound communications from the first microservice of the plurality of microservices, the data being obtained from and captured by a first sidecar function attached to a container for the first microservice and including application behavioral data and metadata of the first microservice;

analyzing the data to learn an operational behavior of the first microservice, based on comparing the application behavioral data and the metadata of the first microservice with stored information about microservices in order to find a match associated with the operational behavior, and to determine a firewall rule set to be applied associated with the first microservice based on the operational behavior learned for the first microservice; and     instructing the mesh orchestrator to instantiate a micro-firewall for the first microservice, the micro-firewall configured to apply the firewall rule set to inbound communications to the first microservice and outbound communications from the first microservice.

19. The computer readable storage media of claim 18, wherein the instructions to perform the analyzing include instructions to learn the operational behavior of the first microservice by determining a type of application running in the first microservice and determine the firewall rule set according to rules associated with normal behavior of a microservice that performs the type of application running in the first microservice.

20. The computer readable storage media of claim 18, wherein the instructions are further operable for, when a new microservice container is created that includes a microservice that is similar to the first microservice, instructing the mesh orchestrator to instantiate a new micro-firewall for the new microservice container according to the micro-firewall for the first microservice without performing the analyzing for the new microservice container.

\* \* \* \* \*